US006329080B1

(12) United States Patent
Ishio

(10) Patent No.: US 6,329,080 B1
(45) Date of Patent: Dec. 11, 2001

(54) HIGH STRENGTH CLAD MATERIAL WITH EXCELLENT MOLDING PROPERTIES

(75) Inventor: Masaaki Ishio, Suita (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 09/894,126

(22) Filed: Jun. 29, 2001

Related U.S. Application Data

(63) Continuation of application No. 09/463,620, filed as application No. PCT/JP98/01760 on Apr. 17, 1998.

(30) Foreign Application Priority Data

Jul. 31, 1997 (JP) .................................................. 9-220826
Mar. 13, 1998 (JP) .................................................. 10-82667

(51) Int. Cl.$^7$ .................................................. B32B 15/18
(52) U.S. Cl. .................. 428/685; 428/680; 428/924; 428/925; 428/940; 429/164
(58) Field of Search ................................ 428/685, 680, 428/924, 925, 940; 429/164

(56) References Cited

U.S. PATENT DOCUMENTS 5,376,464 * 12/1994 Dupoiron et al. .................. 428/685

FOREIGN PATENT DOCUMENTS 1-172579-A * 7/1989 (JP) ................................ B32B/15/01
6-275770-A * 9/1994 (JP) ................................ B32B/15/01

* cited by examiner

*Primary Examiner*—Robert R. Koehler
(74) *Attorney, Agent, or Firm*—Dykema Gossett PLLC

(57) ABSTRACT

An object of the present invention is to provide a three-layer clad material in which stainless steel is used as the substrate, Ni or an Ni alloy is monolithically pressure-welded to either principal plane of the substrate, and Cu is monolithically pressure-welded to the other principal plane, or a two- or three-layer clad material in which Ni or an Ni alloy is monolithically pressure-welded to at least one principal plane of the substrate, wherein this high-strength, high-drawability clad material allows the thickness ratio of the stainless steel to be further increased, mechanical strength (tensile strength) to be raised above that of a conventional two- or three-layer clad material, and the thickness of the entire clad material to be reduced. Uniform tension can be created across the entire thin sheet, folding or creasing can be prevented from occurring during pressure welding, the thickness of the thin Ni and Cu sheets prior to pressure welding can be reduced to about 5 $\mu$m, and the thickness ratio of each of the thin sheets in the three-layer clad material for cell cases can be reduced to about 0.5% of the entire thickness by adopting a method in which specially configured and sized tension bridle rolls are placed upstream of pressure rolls, and Ni, Cu, and other thin sheets are fed to the pressure rolls through the agency of these tension bridle rolls.

8 Claims, 1 Drawing Sheet

HIGH STRENGTH CLAD MATERIAL WITH EXCELLENT MOLDING PROPERTIES

CROSS-REFERENCE TO RELATED APPLICATION

This application is a continuation of application Ser. No. 09/463,620, filed Jan. 28, 2000, now allowed, which was a U.S. national phase filing of PCT/JP98/01760, filed Apr. 17, 1998.

TECHNICAL FIELD

The present invention relates to a thin, high-strength clad material that has a tensile strength of 70 kgf/mm$^2$ or higher, possesses excellent press forming, and can be deep-drawn by performing prescribed plating; and more particularly to a three-layer clad material which can be used, in particular, as a clad material for forming the anode case of a button cell or the like and in which stainless steel is used as the substrate, Ni or can Ni alloy is monolithically pressure-welded to either principal plane of the substrate, and Cu is monolithically pressure-welded to the other principal plane; and to a two-or three-layer clad material which can be used as a clad material for forming a cathode case and in which stainless steel is used as the substrate, and Ni or Ni alloy is monolithically pressure-welded to at least one principal plane of the substrate.

BACKGROUND ART

Efforts to create smaller and lighter devices have recently intensified in the field of electric equipment, creating an urgent need for developing smaller and thinner cells for use with this equipment. For example, coin cells, button cells, and other cells are being widely used.

Cases for such cells are required to have adequate corrosion resistance, electrical conductivity, and deep drawability. Examples of materials used for anode cases include so-called three-layer clad materials in which stainless steel is used as the substrate, Ni is integrated with one principal plane of this substrate, and Cu is integrated with the other principal plane. In addition, so-called two- or three-layer clad materials in which stainless steel is used as the substrate, and Ni is integrated with one or both principal planes of this substrate are used for cathode cases.

With such button cells, battery life is determined by the amount of electrochemical reagent stored in the case, requiring that the capacity of the case be increased in order to extend battery life.

Some applications, however, impose restrictions on the outside dimensions of cells, forcing researchers to increase the actual case capacity by using thinner cases. It was impossible, however, to obtain case materials that would satisfy these requirements in terms of maintaining the mechanical strength of cases per se, preventing electrochemical reagents from leaking, or the like, making the aforementioned goal unattainable.

As a means of overcoming such shortcomings, it has been proposed to create button cells in which, in particular, the case capacity for accommodating electrochemical reagents is substantially increased by using as an anode case a three-layer clad material in which stainless steel is used as the substrate, Ni is integrated with one principal plane of the substrate, and Cu is integrated with the other principal plane, and setting the weight ratio of the stainless steel in the three-layer clad material to between 77% and 91% of the total amount of clad material (corresponds to a thickness ratio of 79% to 92%); and by using as a cathode case a three-layer clad material in which stainless steel is used as the substrate, Ni is integrated with both principal plane of the substrate, and the temper number of this three-layer clad material is set to a prescribed level (3.5) (Japanese Unexamined Patent Application (Kokai) 8-315869; U.S. Pat. Nos. 5,567,538, 5,582,930, and 5,591,541).

In such button cells, strength per unit of thickness of the clad material can be increased and the thickness reduced while the molding properties needed to form an anode case by pressing or the like can be maintained by increasing the ratio of the stainless steel constituting the substrate of the three-layer clad material that forms the anode case; and the capacity of the anode case can be increased while the strength, stiffness, and crushing resistance required for an anode case are maintained.

Although button cells constructed using anode cases and cathode cases composed of the above-described three-layer clad materials have much longer cell lives than conventional button cells, a need exists for a further increase in battery life and a creation of smaller and lighter cells, and further improvements in three-layer clad materials are desired. At present, however, it is difficult to achieve further increases in the weight ratio (thickness ratio) of the stainless steel constituting the aforementioned substrate.

A structure in which the Ni, Cu, or the like integrated with the principal planes of the stainless steel constituting the substrate is formed by plating is disclosed for the proposed anode case and cathode case described above.

In commercial-scale production, however, cold welding is commonly used to achieve fabrication because of considerations related to productivity, the costs incurred in handling plating equipment or plating solutions, and the like. Specifically, thin Ni or Cu sheets of prescribed thickness are superposed on the principal planes of stainless steel (substrate), and the sheets are pressure-welded and integrated at the same time with the aid of pressure rolls, rolling a three-layer clad material of prescribed thickness.

The creasing or the like of the thin Ni or Cu sheets during pressure welding is prevented by applying a specific amount of tension in the direction upstream of the pressure rolls with the aid of the rolls or other components for feeding these thin sheets, but these thin sheets commonly have a width of about 100 mm to 600 mm and a thickness of about 0.1 mm to 1.0 mm when produced on a commercial scale, so it is difficult to apply uniform tension across the entire thin sheet at a lower sheet thickness.

Consequently, the thin Ni and Cu sheets produce folds and creases when welded under pressure to stainless steel (substrate), ultimately creating surface defects and resulting in inadequate bonding with the substrate. It is therefore impossible to reduce the thickness of a thin Ni or Cu sheet below a certain limit, and, as a result, it is difficult to increase the weight ratio (thickness ratio) of stainless steel in the entire clad material above a certain level.

With an anode case, for example, the total thickness of the clad material is commonly required to be 0.30 mm or less. Conventional methods are therefore capable of ensuring that the weight ratio of Ni in relation to the total amount of clad material is 2% (thickness ratio: 2%), but are less successful in ensuring, in particular, that the weight ratio of Cu in relation to the total amount of clad material is less than 7% (less than 6% in terms of thickness ratio) and, ultimately, that the weight ratio of the combined amount of Ni and Cu in relation to the total amount of clad material is less than 9% (less than 8% in terms of thickness ratio).

It was thus assumed that the weight ratio (thickness ratio) of stainless steel (substrate) had insurmountable limitations and that it was difficult to increase battery life beyond that of a button cell having the above-described proposed structure, that is, a button cell in which the weight ratio of stainless steel was 77% to 91% (corresponds to a thickness ratio of 79% to 92%) of the total amount of clad material.

DISCLOSURE OF THE INVENTION

An object of the present invention is to overcome the above-described shortcomings and to provide a three-layer clad material which can be used, in particular, as a clad material for forming the anode case of a button cell or the like and in which stainless steel is used as the substrate, Ni or an Ni alloy is monolithically pressure-welded to either principal plane of the substrate, and Cu is monolithically pressure-welded to the other principal plane, wherein this high-strength, high-drawability clad material allows the thickness ratio of the stainless steel to be further increased, mechanical strength (tensile strength) to be raised above that of a conventional three-layer clad material, and the thickness of the entire clad material to be reduced.

Another object of the present invention is to provide a two- or three-layer clad material which can be used as a clad material for forming the cathode case of a button cell or the like and in which stainless steel is used as the substrate, and Ni or an Ni alloy is monolithically pressure-welded to at least one principal plane of the substrate, wherein this high-strength, high-drawability clad material allows the thickness ratio of the stainless steel to be further increased, mechanical strength (tensile strength) to be raised above that of a conventional two- or three-layer clad material, and the thickness of the entire clad material to be reduced.

To attain the stated objects, the inventors conducted extensive research into means for preventing folding or creasing from occurring when Ni, Cu, or other thin sheets are bonded under pressure to substrates composed of stainless steel. It became possible, for example, to create uniform tension across the entire thin sheet and to prevent folding or creasing from occurring during pressure welding by adopting a method in which specially configured and sized tension bridle rolls were placed upstream of pressure rolls, and Ni, Cu, and other thin sheets were fed to these pressure rolls through the agency of these tension bridle rolls.

As a result, the thickness of the thin Ni and Cu sheets prior to pressure welding was reduced to about 5 μm, and the thickness ratio of each of the thin sheets in the three-layer clad material for cell cases could be reduced to about 0.5% of the entire thickness. Specifically, it was possible to achieve a maximum of 99% for the thickness ratio of stainless steel in an anode case. Any conventional method for manufacturing three-layer clad materials can be substantially adopted in addition to the above-described method for feeding Ni, Cu, or other thin sheets to pressure rolls.

In addition, it was possible to increase the thickness ratio of stainless steel in a three-layer clad material by adopting the above-described means, to increase the mechanical strength (tensile strength) of the three-layer clad material beyond that of a conventional three-layer clad material by repeating the annealing and temper rolling at a certain temperature, for example shin-pass rolling or another treatment, and in certain cases to increase the strength 10% to 50% above that of a conventional three-layer clad material by adopting a preferred structure.

Specifically, the present invention provides a high-strength, high-drawability clad material which is preferred, in particular, as a material for forming the anode case of a cell or the like and in which stainless steel is used as the substrate, Ni or an Ni alloy is monolithically pressure-welded to either principal plane of the substrate, and Cu is monolithically pressure-welded to the other principal plane, this clad material being such that the thickness of the stainless steel is greater than 92% but no more than 99% of the total thickness of the clad material, and the tensile strength is 70 kgf/mm$^2$ or higher.

With the high-strength clad material thus configured, it is also possible to provide a high-strength, high-drawability clad material whose drowing properties are further improved and which can be molded by deep drawing as a result of the fact that a plating composed of Sn, Sn-Pb, or In is formed on the surface of Cu.

The present invention also provides a high-strength, high-drawability clad material which is preferred, in particular, as a material for forming the cathode case of a cell and in which stainless steel is used as the substrate, and Ni or an Ni alloy is monolithically pressure-welded to at least one principal plane of the substrate, this clad material being such that the thickness of the stainless steel is greater than 98% but no more than 99.5% of the total thickness of the clad material; and a high-strength, high-drawability clad material in which stainless steel is used as the substrate, and Ni or an Ni alloy is monolithically pressure-welded to both principal planes of the substrate, this clad material being such that the thickness of the stainless steel is greater than 96% but no more than 99% of the total thickness of the clad material.

Also proposed is a high-strength, high-drawability clad material of the above-described structure, having a total thickness of 0.05 mm to 0.100 mm.

BEST MODE FOR CARRYING OUT THE INVENTION

Figure 1A:
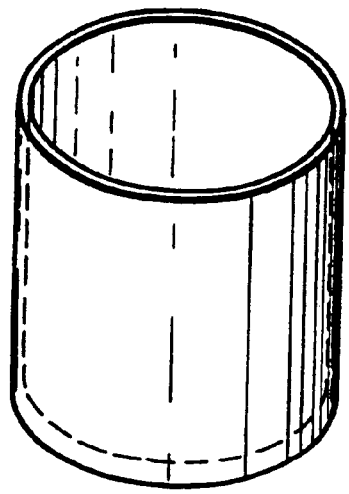
FIGS. 1a and 1b are perspective views illustrating models for evaluating press formability.

Although any conventional material may be used as the stainless steel that constitutes the substrate of the high-strength clad material of the present invention, it is preferable to use austenitic stainless steel, ferritic stainless steel, two-phase stainless steel, precipitation-harden alle stainless steel, or the like because of considerations related to corrosion resistance, drawability, mechanical properties, seal strength, and the like, particularly when the material is used for a cell case.

Although the material for the Ni or Ni alloy to be monolithically pressure-welded to a substrate composed of stainless steel may be selected in accordance with the intended application, it is preferable to use pure nickel because of considerations related to contact resistance, electrical resistance, corrosion resistance, weldability, and the like, particularly when the material is used for the anode case or cathode case of a cell. An Ni alloy to which a specific amount of one or more of Cr, Cu, Be, Nb, C, W, and the like has been added is commonly used within a range of about 2 to 3 wt % because of considerations related to prevention of surface scratch, improved appearance (luster), and the like.

Although the Cu to be monolithically pressure-welded to a substrate composed of stainless steel may be selected in accordance with the intended application, it is preferable to use maximum-purity Cu because of considerations related to corrosion resistance, reactivity toward the electrolyte solution, suppression of gas generation, and the like, particularly when the material is used as the anode case of a cell. The effects of the present invention can also be achieved by using a conventional material containing a certain amount of impurities. From the standpoint of dispensing with mercury or the like, it is also possible to use materials obtained by plating or coating the Cu surface with Sn, Sn-Pb, In, or the like.

The press formability of the clad material of the present invention can be improved and an anode case shaped deeper than the bore diameter can be easily molded by plating the Cu surface with Sn, Sn-Pb, In, or the like.

As noted above, the thickness of the monolithic pressure welding of Ni, an Ni alloy, Cu, or the like to the clad material of the present invention can be markedly reduced, and the thickness of the stainless steel (substrate) relative to the entire clad material significantly increased.

For example, the amount of stainless steel can be increased to 92–99% of the total amount of the clad material obtained by the monolithic pressure welding of Ni and Cu, which is the preferred clad material for anode cases.

According to experiments performed by the inventors, the same effect as that demonstrated by a conventional structure can be obtained when the aforementioned thickness ratio is less than 92%, and fine pores and cracks develop in Ni, Cu, and other layers when the ratio exceeds 99%. In particular, hydrogen gas is produced by reaction with the contained solution and the cell leaks, making it impossible to attain the intended object when the material is used for the anode case of a cell. For these reasons, the thickness ratio is set between 92% and 99%.

A clad material having a tensile strength of 70 kgf/mm$^2$ or higher, and preferably 75 kgf/mm$^2$ or higher, is provided in order to maintain workability at least at the same level as in the past. The tensile strength may be optionally raised to 90 kgf/mm$^2$ or higher, and preferably 95 kgf/mm$^2$ or higher, by performing a specific type of skin-pass rolling.

It is possible to provide a clad material whose total thickness is kept at 0.05 mm to 0.3 mm while the aforementioned thickness ratio of stainless steel is maintained. A range of 0.05 to 0.100 mm is preferred for effectively utilizing the merits of the present invention, and a clad material ranging from 0.07 mm to 0.100 mm is particularly preferred for the anode case of a cell when reduction in thickness is taken into account together with press formability and the like.

As noted above, good monolithic pressure welding can be achieved when the thin Ni sheet not yet pressure-welded has a thickness of about 5 $\mu$m, making it possible to achieve the same effect with respect to the structure of a clad material obtained by the monolithic pressure welding of Ni or an Ni alloy to at least one principal plane of stainless steel in the same manner as in the above-described structure.

In a clad material in which Ni or an Ni alloy is monolithically pressure-welded to either principal plane of the stainless steel substrate, the thickness of the stainless steel can be made greater than 98% but no more than 99.5% of the total thickness of the clad material; and in a clad material in which Ni or an Ni alloy is monolithically pressure-welded to both principal planes of the stainless steel substrate, the thickness of the stainless steel can be made greater than 96% but no more than 99% of the total thickness of the clad material, making it possible to provide a high-strength clad material whose tensile strength is equal to or greater than that of a conventional structure.

This material structure can also yield a clad material whose total thickness is kept at 0.05 mm to 0.3 mm while the aforementioned thickness ratio of stainless steel is maintained. A range of 0.05 to 0.100 mm is preferred for effectively utilizing the merits of the present invention, and a clad material ranging from 0.07 mm to 0.100 mm is particularly preferred for the cathode case of a cell when reduction in thickness is taken into account together with press formability and the like.

In any of the above-described clad materials, hardness, the Erichsen value, and the like can be adjusted as needed in addition to the thickness ratio, total thickness, tensile strength, and the like of each material. With cell cases in particular, various desired clad materials can be obtained by selecting optimum conditions from within the scope of the following claims in accordance with workability, shape, size, and other factors determining case capacity (which is an important parameter of battery life).

Embodiments

Embodiment 1

Table 1 shows the results of a comparison between the tensile strength of a conventional clad material fabricated in accordance with a convectional manufacturing method (without the use of tension bridle rolls), and that of the clad material of the present invention, which was fabricated in accordance with a manufacturing method (using tension bridle rolls) performed using the means described above and applied to a structure in which Ni was monolithically pressure-welded to either principal plane of a stainless steel substrate, and Cu was monolithically pressure-welded to the other principal plane in order to confirm the merits of the present invention. Similar to the conventional clad material, the clad material of the present invention had a total thickness of 0.09 mm.

An SUS 304 equivalent (JIS G4307) was used as the stainless steel for the substrate, a VNiR equivalent (JIS H4501) was used as the Ni, and a C1020 equivalent (JIS H3100) was used as the Cu. The tensile strength, hardness, and Erichsen value were measured in accordance with JIS Z2241, JIS Z2251, and JIS Z2247, respectively.

TABLE 1

|  | Sample No. | Thickness ratio Ni:SUS:Cu | Increase in SUS (%) | Tensile strength (kgf/mm$^2$) | SUS hardness H$_V$ | Erichsen value (mm) |
|---|---|---|---|---|---|---|
| Conventional material | 1 | 8:76:16 | 100 | 65 | 170 | 12 |
|  | 2 | 8:84:8 | 110 | 68 | 170 | 12 |
|  | 3 | 2:91:7 | 120 | 71 | 170 | 12 |
| Material of present invention | 4 | 2:92.5:5.5 | 121 | 72 | 170 | 12 |
|  | 5 | 2:94:4 | 124 | 73 | 170 | 12 |
|  | 6 | 2:96:2 | 126 | 74 | 170 | 12 |
|  | 7 | 1:98:1 | 129 | 75 | 170 | 12 |
|  | 8 | 0.5:99:0.5 | 130 | 76 | 170 | 12 |

TABLE 1-continued

| | Sample No. | Thickness ratio Ni:SUS:Cu | Increase in SUS (%) | Tensile strength (kgf/mm$^2$) | SUS hardness H$_V$ | Erichsen value (mm) |
|---|---|---|---|---|---|---|
| Material of present invention | 9 | 2:92.5:5.5 | 121 | 94 | 330 | 8 |
| | 10 | 0.5:99:0.5 | 130 | 98 | 330 | 9 |

Note 1: "Increase in SUS" designates the SUS thickness of each sample, assuming that the SUS thickness of sample No. 1, which is a conventional clad material, is 100.
Note 2: Sample Nos. 9 and 10 were obtained by subjecting clad material sample Nos. 4 and 8, respectively, to skin-pass rolling.

It can be seen in Table 1 that a clad material of the present invention has better tensile strength than a conventional clad material. In addition, the Erichsen value remains about the same as that of a conventional clad material, indicating that deep drawability remains as good as that of a conventional clad material.

Embodiment 2

Table 2 shows the results of a comparison between the tensile strength of a conventional clad material and that of the clad material of the present invention, whose thickness was varied in order to confirm the merits of the present invention. The stainless steel (substrate), Ni, and Cu were the same materials as those in Example 1.

TABLE 2

| | Sample No. | Thickness of clad material (mm) | Thickness ratio Ni:SUS:Cu | Increase in SUS (%) | Tensile strength (kgf/mm$^2$) | Erichsen value (mm) |
|---|---|---|---|---|---|---|
| Conventional material | 11 | 0.15 | 8:76:16 | 100 | 65 | 12 |
| | 12 | 0.15 | 2:91:7 | 120 | 71 | 12 |
| Material of present invention | 13 | 0.30 | 0.5:99:0.5 | 130 | 76 | 12 |
| | 14 | 0.20 | 0.5:99:0.5 | 130 | 76 | 12 |
| | 15 | 0.15 | 0.5:99:0.5 | 130 | 76 | 12 |
| | 16 | 0.13 | 0.5:99:0.5 | 130 | 76 | 12 |
| | 17 | 0.10 | 0.5:99:0.5 | 130 | 76 | 12 |
| | 18 | 0.08 | 0.5:99:0.5 | 130 | 76 | 12 |
| | 19 | 0.07 | 0.5:99:0.5 | 130 | 76 | 12 |
| | 20 | 0.05 | 0.5:99:0.5 | 130 | 76 | 10 |
| | 21 | 0.10 | 2:92.5:5.5 | 121 | 72 | 12 |
| | 22 | 0.10 | 2:94:4 | 124 | 73 | 12 |
| | 23 | 0.10 | 2:96:2 | 126 | 74 | 12 |
| | 24 | 0.10 | 1:98:1 | 129 | 75 | 12 |
| Material of present invention | 25 | 0.10 | 2:92.5:5.5 | 121 | 94 | 8 |
| | 26 | 0.10 | 0.5:99:0.5 | 130 | 98 | 9 |

Note 1: "Increase in SUS" designates the SUS thickness of each sample, assuming that the SUS thickness of sample No. 11, which is a conventional clad material, is 100.
Note 2: Sample Nos. 25 and 26 were obtained by subjecting clad material sample Nos. 21 and 17, respectively, to skin-pass rolling.

It can be seen in Table 2 above that a clad material of the present invention has better tensile strength than does a conventional clad material and that the thickness of the proposed clad material can be reduced by about 5% to 50% when its tensile strength is about the same as that of the conventional clad material. When, for example, the proposed material is used for the anode case of a cell, the capacity of the case can be increased by reducing the thickness of the case while preserving the same outside dimensions thereof. Longer battery life can be achieved as a result.

Embodiment 3

Table 3 shows the results of a comparison between the tensile strength of a conventional clad material fabricated in accordance with a convectional manufacturing method (without the use of tension bridle rolls), and that of the clad material of the present invention, which was fabricated by a manufacturing method (using tension bridle rolls) performed using the means described above and applied to a structure in which Ni was monolithically pressure-welded to one or both principal planes of a stainless steel substrate in order to confirm the merits of the present invention.

Similar to the conventional clad material, the clad material of the present invention had a total thickness of 0.09 mm. An SUS 304 equivalent (JIS G4307) was used as the stainless steel for the substrate, and a VNiR equivalent (JIS H4501) was used as the Ni. The tensile strength was measured on the basis of JIS Z2241.

TABLE 3

| | Sample No. | Thickness ratio Ni:SUS:Ni | Increase in SUS (%) | Tensile strength (kgf/mm$^2$) |
|---|---|---|---|---|
| Conventional clad material | 27 | 2:98:0 | 100 | 75 |
| Clad material of present invention | 28 | 1.5:98.5:0 | 101 | 85 |
| | 29 | 1.0:99.0:0 | 101 | 86 |
| | 30 | 0.5:99.5:0 | 102 | 87 |
| Clad material of present | 31 | 2:96:2 | 100 | 74 |

TABLE 3-continued

| | Sample No. | Thickness ratio Ni:SUS:Ni | Increase in SUS (%) | Tensile strength (kgf/mm$^2$) |
|---|---|---|---|---|
| invention | | | | |
| Conventional | 32 | 1.75:96.5:1.75 | 101 | 80 |
| clad material | 33 | 1.0:98.0:1.0 | 102 | 81 |
| | 34 | 0.5:99.0:0.5 | 103 | 82 |

Note 1: "Increase in SUS" designates the SUS thickness of sample Nos. 28 to 30 and 32 to 34, assuming that the SUS thickness of sample No. 27 or 31, which is a conventional clad material, is 100.

The clad material of the present invention in Table 3 was obtained by skin-pass rolling. It can be seen that the clad material of the present invention has better tensile strength than does the conventional clad material. It could also be confirmed that even without undergoing skin-pass rolling, the proposed clad material has at least the same tensile strength as the conventional clad material.

Embodiment 4

To confirm that the clad material of the present invention could be used as the anode case of a cell, the clad material (total thickness: 0.09 mm) pertaining to the present invention and consisting of sample Nos. 4 to 10 (Ni/SUS/Cu) in Example 1 was drawn by press-working into a bottomed cylinder with an outside diameter of 7 mm and a height of 6 mm (FIG. 1a) such that the inner peripheral surface thereof was Cu. The results are shown in Table 4. The material yielded a regularly shaped case which had a high degree of roundness and was devoid of cracks, fractures, or the like.

TABLE 4

| | Total thickness (mm) | Sample No. | Thickness ratio Ni:SUS:Cu | Inner-layer material during pressure forming | Press formability |
|---|---|---|---|---|---|
| Clad | 0.09 | 4 | 2:92.5:5.5 | Cu | Good |
| material | 0.09 | 5 | 2:94:4 | Cu | Good |
| of | 0.09 | 6 | 2:96:2 | Cu | Good |
| present | 0.09 | 7 | 1:98:1 | Cu | Good |
| invention | 0.09 | 8 | 0.5:99:0.5 | Cu | Good |
| | 0.09 | 9 | 2:92.5:5.5 | Cu | Good |
| | 0.09 | 10 | 0.5:99:0.5 | Cu | Good |

Embodiment 5

To confirm that the clad material of the present invention could be used as the cathode case of a cell, the clad material (total thickness: 0.09 mm) pertaining to the present invention and consisting of sample Nos. 28 to 30 (Ni/SUS) and Nos. 32 to 34 (Ni/SUS/Ni) in Example 3 was drawn by press-working into a bottomed cylinder with an outside diameter of 7 mm and a height of 6 mm (FIG. 1a). The results are shown in Table 5. Sample Nos. 28 to 30 were formed such that the inner peripheral surfaces thereof were SUS. The material yielded a regularly shaped case which had a high degree of roundness and was devoid of cracks, fractures, or the like.

TABLE 5

| | Total thickness (mm) | Sample No. | Thickness ratio Ni:SUS:Ni | Inner-layer material during pressure forming | Press formability |
|---|---|---|---|---|---|
| Clad | 0.09 | 28 | 1.5:98.5:0 | SUS | Good |
| material | 0.09 | 29 | 1.0:99.0:0 | SUS | Good |
| of | 0.09 | 30 | 0.5:99.5:0 | SUS | Good |
| present | 0.09 | 32 | 1.75:96.5:1.75 | Ni | Good |
| invention | 0.09 | 33 | 1.0:98.0:1.0 | Ni | Good |
| | 0.09 | 34 | 0.5:99.0:0.5 | Ni | Good |

Embodiment 6

Figure 1B:
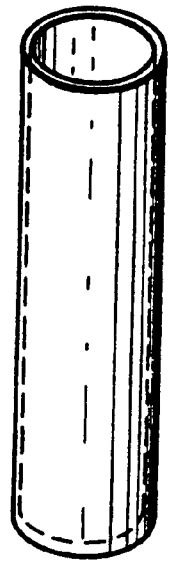

Drawing was performed under even more stringent conditions than in Examples 4 and 5 in order to confirm that press formability could be improved by plating the clad material of the present invention. Specifically, the clad material (total thickness: 0.09 mm) pertaining to the present invention and consisting of sample Nos. 4 to 10 (Ni/SUS/Cu) in Example 1, as well as clad materials obtained by plating the Cu surface of this clad material with Sn, Sn-Pb, or In (thickness: 2 µm), were drawn by press-working into bottomed cylinders with an outside diameter of 3 mm and a height of 10 mm (FIG. 1b) such that the inner peripheral surface was the Cu side. The results are shown in Table 6. The following grading system is adopted in Table 6 for evaluating press formability: "⊚" indicates good formability, "○" indicates cases in which slight shape defects have developed, and "X" indicates cases in which the material have fractured and cannot be press-formed.

TABLE 6

| | Sample No. | Total cladding thickness (mm) | Plating and thickness | Cladding thickness ratio Ni:SUS:Cu | Press formability |
|---|---|---|---|---|---|
| Clad | 4 | 0.09 | None | 2:92.5:5.5 | ○ |
| material | 5 | 0.09 | None | 2:94:4 | ○ |
| of | 6 | 0.09 | None | 2:96:2 | ○ |
| present | 7 | 0.09 | None | 1:98:1 | ○ |
| invention | 8 | 0.09 | None | 0.5:99:0.5 | ○ |
| | 9 | 0.09 | None | 2:92.5:5.5 | X |
| | 10 | 0.09 | None | 0.5:99:0.5 | X |
| Clad | 35 | 0.09 | Sn 2 µm | 2:92.5:5.5 | ⊚ |
| material | 36 | 0.09 | Sn 2 µm | 2:94:4 | ⊚ |
| of | 37 | 0.09 | Sn 2 µm | 2:96:2 | ⊚ |
| present | 38 | 0.09 | Sn 2 µm | 1:98:1 | ⊚ |
| invention | 39 | 0.09 | Sn 2 µm | 0.5:99:0.5 | ⊚ |
| | 40 | 0.09 | Sn 2 µm | 2:92.5:5.5 | ⊚ |
| | 41 | 0.09 | Sn 2 µm | 0.5:99:0.5 | ⊚ |
| Clad | 42 | 0.09 | Sn—Pb 2 µm | 2:92.5:5.5 | ⊚ |
| material | 43 | 0.09 | Sn—Pb 2 µm | 2:94:4 | ⊚ |
| of | 44 | 0.09 | Sn—Pb 2 µm | 2:96:2 | ⊚ |
| present | 45 | 0.09 | Sn—Pb 2 µm | 1:98:1 | ⊚ |
| invention | 46 | 0.09 | Sn—Pb 2 µm | 0.5:99:0.5 | ⊚ |
| | 47 | 0.09 | Sn—Pb 2 µm | 2:92.5:5.5 | ⊚ |
| | 48 | 0.09 | Sn—Pb 2 µm | 0.5:99:0.5 | ⊚ |
| Clad | 49 | 0.09 | In 2 µm | 2:92.5:5.5 | ⊚ |
| material | 50 | 0.09 | In 2 µm | 2:94.:4 | ⊚ |
| of | 51 | 0.09 | In 2 µm | 2:96:2 | ⊚ |
| present | 52 | 0.09 | In 2 µm | 1:98:1 | ⊚ |
| invention | 53 | 0.09 | In 2 µm | 0.5:99:0.5 | ⊚ |
| | 54 | 0.09 | In 2 µm | 2:92.5:5.5 | ⊚ |
| | 55 | 0.09 | In 2 µm | 0.5:99:0.5 | ⊚ |

Unplated sample Nos. 4 to 8 did not have cracks, fractures, or the like but their press formability could not be considered satisfactory. It was also possible to confirm that unplated sample Nos. 9 and 10 had cracks, fractures, and the like, and that the press forming itself was difficult to perform.

The clad materials obtained by plating the Cu surfaces of sample Nos. 4 to 10 with Sn, Sn-Pb, or In, on the other hand, were free of cracks, fractures, or the like and yielded regularly shaped cases with a high degree of roundness. It was confirmed that the range of applications of the clad material of the present invention could be further broadened by performing adequate press forming on sample Nos. 9 and 10, which have high tensile strength and are normally unsuitable for drawing.

Industrial Applicability

It is evident from the examples described above that the clad material of the present invention allows the thickness ratio of stainless steel to be further increased, a mechanical strength (tensile strength) equal to or greater than that of a conventional clad material to be obtained, and the total thickness of the clad material to be reduced in a three-layer clad material in which stainless steel is used as the substrate, Ni or an Ni alloy is monolithically pressure-welded to either principal plane of the substrate, and Cu is monolithically pressure-welded to the other principal plane; or in a two- or three-layer clad material in which stainless steel is used as the substrate, and Ni or an Ni alloy is monolithically pressure-welded to at least one principal plane of the substrate, making it possible to increase the capacity of the anode case, cathode case, or the like for a button cell or the like, to substantially increase the capacity of the product for storing electrochemical reagents, to yield smaller and lighter products, and to extend battery life while preserving the strength, stiffness, and crushing resistance required of the case when the material is used for forming this case.

In the particular case of a three-layer clad material having a Cu layer, press formability can be improved by plating the Cu surface with Sn, Sn-Pb, In, or the like, making it possible to further broaden the range of applications for the clad material of the present invention as a result of a synergistic effect with the above-described effect.

What is claimed is:

1. A high-strength, high-drawability clad material, comprising stainless steel as a substrate; and Ni or an Ni alloy monolithically pressure-welded to either principal plane of said substrate, said stainless steel having a thickness greater than 98% but no more than 99.5% of the total thickness of the clad material and wherein said clad material has a tensile strength of at least 75 kgf/mm$^2$.

2. A high-strength, high-drawability clad material as defined in claim 1, wherein said clad material has a tensile strength of at least 85 kgf/mm$^2$.

3. A high-strength, high-drawability clad material, comprising stainless steel as a substrate; and Ni or an Ni alloy monolithically pressure-welded to both principal planes of said substrate, said stainless steel having a thickness greater than 96% but no more than 99% of the total thickness of the clad material and wherein said clad material has a tensile strength of at least 74 kgf/mm$^2$.

4. A high-strength, high-drawability clad material as defined in claim 3, wherein said clad material has a tensile strength of at least 80 kgf/mm$^2$.

5. A high-strength, high-drawability clad material as defined in claims 1 or 3, wherein said clad material has a total thickness of 0.05 mm to 0.3 mm.

6. A high-strength, high-drawability clad material as defined in claim 5, wherein said clad material has a total thickness of 0.05 mm to 0.100 mm.

7. A high-strength, high-drawability clad material as defined in claims 1 or 3, wherein said clad material has a drawability to form a cathode case of a cell.

8. A high-strength, high-drawability clad material as defined in claims 1 or 3, wherein said clad material is in the form of a bottomed cylinder.

\* \* \* \* \*